(12) United States Patent
Kikin Gil

(10) Patent No.: US 10,360,455 B2
(45) Date of Patent: Jul. 23, 2019

(54) GROUPING CAPTURED IMAGES BASED ON FEATURES OF THE IMAGES

(71) Applicant: Microsoft Technology Licensing, LLC, Redmond, WA (US)

(72) Inventor: Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/481,545

(22) Filed: Apr. 7, 2017

(65) Prior Publication Data

US 2018/0293440 A1 Oct. 11, 2018

(51) Int. Cl.
*G06K 9/00* (2006.01)
*G06K 9/32* (2006.01)
(Continued)

(52) U.S. Cl.
CPC ......... *G06K 9/00684* (2013.01); *G06F 16/51* (2019.01); *G06F 16/54* (2019.01); *G06F 16/58* (2019.01); *G06F 16/5846* (2019.01); *G06F 16/5866* (2019.01); *G06F 16/9535* (2019.01); *G06F 17/241* (2013.01); *G06F 17/2785* (2013.01); *G06K 9/3258* (2013.01); *H04N 1/2112* (2013.01); *G06K 2209/01* (2013.01); *H04N 2201/3215* (2013.01); *H04N 2201/3253* (2013.01)

(58) Field of Classification Search
None
See application file for complete search history.

(56) References Cited

U.S. PATENT DOCUMENTS 7,580,952 B2 8/2009 Logan et al.
8,098,934 B2 1/2012 Vincent et al.
(Continued)

FOREIGN PATENT DOCUMENTS

EP 2187322 A1 5/2010

OTHER PUBLICATIONS

Bhute, et al., "Text Based Approach for Indexing and Retrieval of Image and Video: A Review", In International Journal of Advances in Vision Computing, vol. 1, No. 1, Mar. 2014, pp. 27- 38.
(Continued)

*Primary Examiner* — Idowu O Osifade
(74) *Attorney, Agent, or Firm* — Michael Best & Friedrich LLP

(57) ABSTRACT

Systems, devices and methods for automatic narrative creation for captured images. In one example, the system and method perform or include capturing, with an image sensor, a plurality of images having at least one object; creating, with an electronic processor, an initial sequence of images based on a time stamp associated with each image in the plurality of images; identifying, with the electronic processor, textual information within at least one image in the plurality of images; and generating a grouping of the plurality of images based on a criteria selected from a group consisting of a location associated with the plurality of images, textual information within an image in the plurality of images, a search score associated with the at least one object, and a time gap between consecutive images in the initial sequence of the plurality of images.

20 Claims, 4 Drawing Sheets

(51) Int. Cl.
*H04N 1/21* (2006.01)
*G06F 16/51* (2019.01)
*G06F 16/54* (2019.01)
*G06F 16/58* (2019.01)
*G06F 17/24* (2006.01)
*G06F 17/27* (2006.01)
*G06F 16/583* (2019.01)
*G06F 16/9535* (2019.01)

(56) References Cited

U.S. PATENT DOCUMENTS

| | | | |
|---|---|---|---|
| 8,611,678 | B2 | 12/2013 | Hanson et al. |
| 8,705,891 | B2 | 4/2014 | Wang et al. |
| 9,390,107 | B2 | 7/2016 | Cohen et al. |
| 2006/0251339 | A1 | 11/2006 | Gokturk et al. |
| 2008/0273796 | A1 | 11/2008 | Kansal et al. |
| 2010/0076976 | A1 | 3/2010 | Sotirov et al. |
| 2012/0082401 | A1 | 4/2012 | Berger et al. |
| 2012/0158850 | A1 | 6/2012 | Harrison et al. |
| 2015/0206169 | A1* | 7/2015 | Ye ............... G06Q 30/0242 705/14.41 |
| 2015/0363640 | A1 | 12/2015 | Meyer |
| 2016/0110355 | A1 | 4/2016 | Charania et al. |
| 2016/0125254 | A1 | 5/2016 | Vincent et al. |
| 2016/0357785 | A1 | 12/2016 | Titi et al. |
| 2017/0011279 | A1 | 1/2017 | Soldevila et al. |

OTHER PUBLICATIONS

Monckton, Paul, "Microsoft's Spooky New Bot Can Automatically Caption Your Photos—Sometimes", http://www.forbes.com/sites/paulmonckton/2016/03/31/captionbot-describes-your-images/, Published on: Mar. 31, 2016, 8 pages.

Bernardi, et al., "Automatic Description Generation From Images: A Survey of Models, Datasets, and Evaluation Measures", In Journal of Artificial Intelligence Research, vol. 55, Jan. 15, 2016, 34 Pages.

Jung, et al., "Text Information Extraction in Images and Video: A Survey", In Journal of Pattern Recognition, vol. 37, Issue 5, May 1, 2004, 21 Pages.

"International Search Report and Written Opinion Issued in PCT Application No. PCT/US18/024987", dated Jun. 7, 2018, 15 Pages.

* cited by examiner

US 10,360,455 B2

GROUPING CAPTURED IMAGES BASED ON FEATURES OF THE IMAGES

FIELD

Embodiments described herein relate to systems and methods for automatic narrative creation for captured content.

BACKGROUND

Front-facing cameras on mobile phones and other computing devices (e.g., smart phones, smart watches, tablets, etc.) have enhanced the capability of users to capture, save, and share content (for example, still images or video images with audio) easily. Organizing the captured content becomes tedious especially when the volume of captured content is large. Organizing the content may also be difficult when some time has elapsed after the content was captured. For example, the user of the device might be unable to recall specific particulars of the content and the context under which the content was captured when attempting to organize the content at a date after the date of capture.

SUMMARY

Systems and methods are provided herein that, among other things, allow a user to automatically create a narrative based on the images captured by a portable communication device based on context awareness. In one example, the systems and methods provide (1) automatic media grouping based on a time and/or location of captured images; (2) ordering of images based on a time of capture of the images; (3) conversion of images of signs and captions to textual information; (4) determining textual semantics based at least on a relative text size and a location of the capture; and (5) associating the textual semantics with the captured images.

In another example, the systems and method provide for (1) creating an initial sequence of captured images; (2) creating various groups of the captured images based on the time when each of the images were captured, the location where the images were captured, any textual information included in the captured images, any match between objects within the captured images to previously stored images, and any search score associated with objects in the captured image; (3) associating various objects to each other within a group based on the relationship between the objects with the captured images; and (4) verifying and enhancing captured images based on conducting a search of captured textual information, performing image matching and face recognition, and searching for additional content associated with the captured images.

One embodiment provides a computing device that is configured to automatically generate a narrative for captured images. The computing device comprises an image sensor to capture an image of an object. The computing device also includes an electronic processor configured to determine a location and a time associated with the captured image. The electronic processor is also configured to identify textual information in the captured image; determine semantics associated with the textual information; determine captions for the captured image based on at least one selected from the group consisting of the location of capture, the time of capture, and the semantics associated with the textual information. The electronic processing is also configured to organize the image into one or more groups based on one or more criteria selected from the group consisting of a location of the object, time associated with the captured image, and semantics associated with the textual information in the captured image.

Another embodiment provides a method for automatic narrative creation for captured content. In one example, the method comprises capturing, with an image sensor, a plurality of images having at least one object. The method also includes creating, with an electronic processor, an initial sequence of the plurality of images based on a time stamp associated with each image in the plurality of images. The method also includes identifying, with the electronic processor, textual information within at least one image in the plurality of images; and generating a grouping of the plurality of images based on a criteria selected from a group consisting of a location associated with the plurality of images, textual information within an image in the plurality of images, a search score associated with the at least one object, and a time gap between consecutive images in the initial sequence of images.

Another embodiment provides a non-transitory computer-readable medium containing computer-executable instructions that when executed by one or more processors cause the one or more processors to capture, via an image sensor, a plurality of images having at least one object; create, with an electronic processor, an initial sequence of images based on a time stamp associated with each image in the plurality of images; analyze, with the electronic processor, the time stamp associated with each image in the plurality of images; and identify, with the electronic processor, textual information within at least one image in the plurality of images. The one or more electronic processors is configured to generate a grouping of the plurality of images based on a criteria selected from a group consisting of a location associated with the plurality of images, textual information within an image in the plurality of images, a search score associated with the at least one object, and a time gap between consecutive images in the initial sequence of images. The one or more electronic processors are configured to automatically create a narrative associated with the plurality of images.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
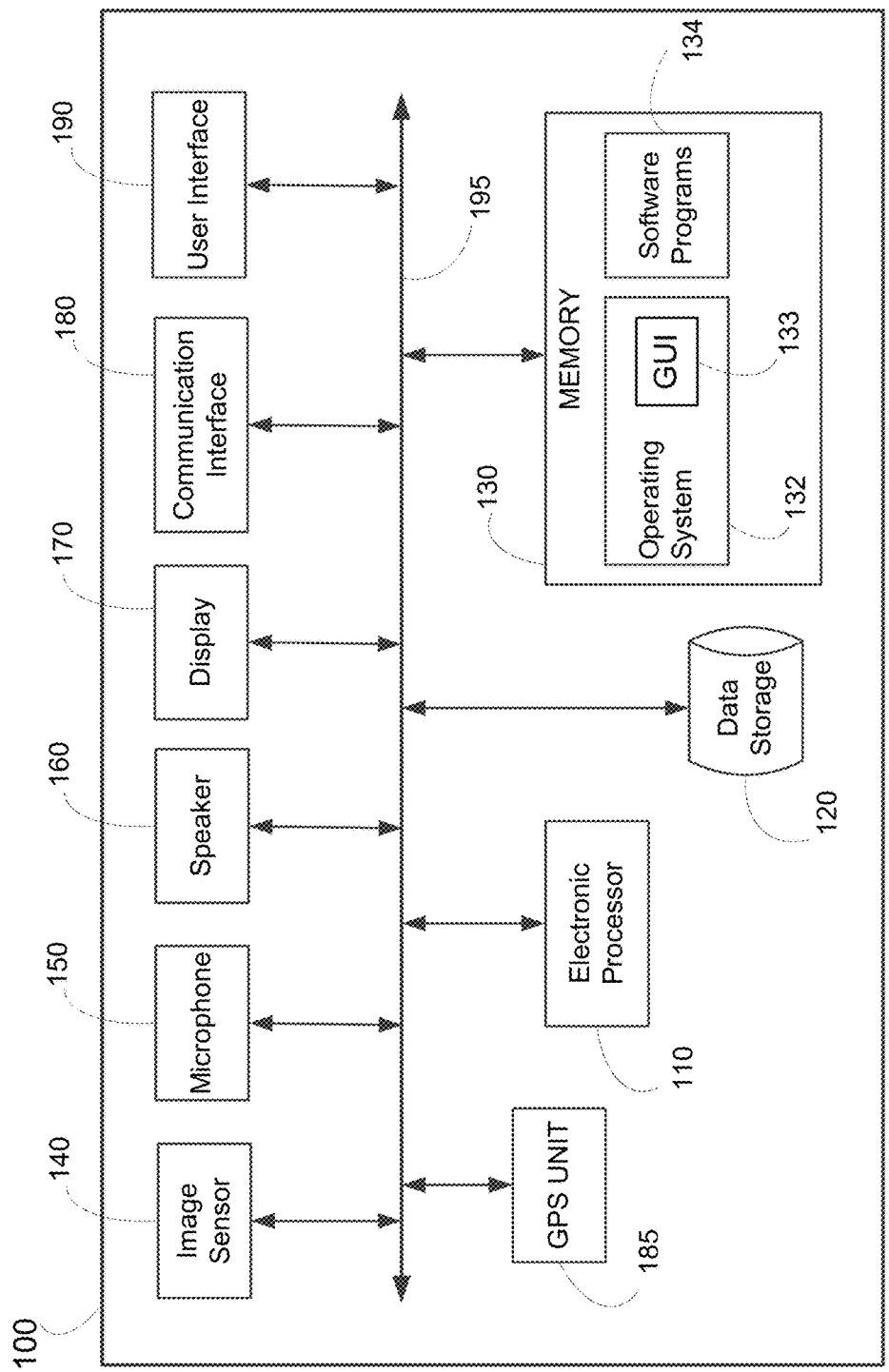
FIG. 1 illustrates a block diagram of the computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein. The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. It should also be noted that a plurality of hardware and software based devices may be utilized to implement various embodiments.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a block diagram of the computing device 100 in accordance with some embodiments. The computing device 100 may combine hardware, software, firmware, and system on-a-chip technology to implement the method of automatic creation for captured content as provided herein. In some embodiments, the computing device 100 includes an electronic processor 110, a data storage device 120, a memory 130, an image sensor 140, a microphone 150, a speaker 160, a display 170, a communication interface 180, a user interface 190 that can be hardware-based (for example, electronic mouse, keyboard, trackball, stylus, touch-pad, touchscreen, etc.) or software-based (for example, graphical user interface (GUI)) and a bus 195.

The memory 130 includes an operating system 132 and one or more software programs 134 that retrieve various content and automatically generate a document associated with the vocalization. In some embodiments, the operating system 132 includes a graphical user interface (GUI) program or generator 133 that provides a human-computer interface. The graphical user interface generator 133 may cause an interface to be displayed that includes icons, menus, and other visual indicators or graphical representations to display information and related user controls. In some embodiments, the graphical user interface generator 133 is configured to interact with a touchscreen to provide a touchscreen-based user interface. In one embodiment, the electronic processor 110 may include at least one microprocessor and be in communication with at least one microprocessor. The microprocessor interprets and executes a set of instructions stored in the memory 130. The one or more software programs 134 may be configured to implement the methods described herein. In some embodiments, the memory 130 includes, for example, random access memory (RAM), read-only memory (ROM), and combinations thereof. In some embodiments, the memory 130 has a distributed architecture, where various components are situated remotely from one another, but may be accessed by the electronic processor 110.

The data storage device 120 may include a non-transitory, machine-readable storage medium that stores, for example, one or more databases. In one example, the data storage device 120 also stores executable programs, for example, a set of instructions that when executed by one or more processors cause the one or more processors to perform the one or more methods describe herein. In one example, the data storage device 120 is located external to the computing device 100.

The communication interface 180 provides the computing device 100 a communication gateway with an external network (for example, a wireless network, the internet, etc.). The communication interface 180 may include, for example, an Ethernet card or adapter or a wireless local area network (WLAN) integrated circuit, card or adapter (for example, IEEE standard 802.11a/b/g/n). The communication interface 180 may include address, control, and/or data connections to enable appropriate communications with the external network.

The user interface 190 provides a mechanism for a user to interact with the computing device 100. As noted above, the user interface 190 includes input devices such as a keyboard, a mouse, a touch-pad device, and others. In some embodiments, the display 170 may be part of the user interface 90 and may be a touchscreen display. In some embodiments, the user interface 190 may also interact with or be controlled by software programs including speech-to-text and text-to-speech interfaces. In some embodiments, the user interface 190 includes a command language interface, for example, a software-generated command language interface that includes elements configured to accept user inputs, for example, program-specific instructions or data. In some embodiments, the software-generated components of the user interface 190 includes menus that a user may use to choose particular commands from lists displayed on the display 170.

The bus 195, or other component interconnection, provides one or more communication links among the components of the computing device 100. The bus 195 may be, for example, one or more buses or other wired or wireless connections. The bus 195 may have additional elements, which are omitted for simplicity, such as controllers, buffers (for example, caches), drivers, repeaters, and receivers, or other similar components, to enable communications. The bus 195 may also include address, control, data connections, or a combination of the foregoing to enable appropriate communications among the aforementioned components.

In some embodiments, the electronic processor 110, the image sensor 140 and the memory 130 are included in a single computing device (for example, within a common housing), such as a smart telephone, smart watch or other wearable, or another suitable computing device. In these embodiments, the electronic processor 110 executes a software program 134 that is locally stored in the memory 130 of the computing device 100 to perform the methods described herein. For example, the electronic processor 110 may execute the software program to access and process data (for example, images) stored in the memory 130 and/or the data storage device 120. Alternatively or in addition, the electronic processor 110 may execute the software application to access data (for example, images) stored external to the computing device (for example, on a server accessible over a communication network such as the internet). The electronic processor 110 may output the results of processing the accessed data (for example, an automatically created narrative of the images) to the display 170 included in the computing device 100.

In other embodiments, the electronic processor 110, the image sensor 140, the memory 130, or a combination thereof may be included in one or more separate devices. For example, in some embodiments, the image sensor 140 may be included in a smart phone configured to transmit an image captured by the image sensor 140 to a server including the memory 130 and one or more other components illustrated in FIG. 1 over a wired or wireless communication network or connection. In this configuration, the electronic processor 110 may be included in the server (for example, 330 in FIG. 3) or another device that communicates with the server over a wired or wireless network or connection. For example, in some embodiments, the electronic processor 110 may be included in the server and may execute a software application that is locally stored on the server to access and process data as described herein. In particular, the electronic processor 110 may execute the software application on the server, which a user may access through a software application, such as a browser application or a mobile application) executed by a computing device of the user. Accordingly, functionality provided by a system 300 as described below may be distributed between a computing device 100 of a user and a server 330 remote from the computing device 100. For example, a user may execute a software program on his or her personal computing device to communicate with another software program executed by an electronic processor included in a remote server.

Figure 2:
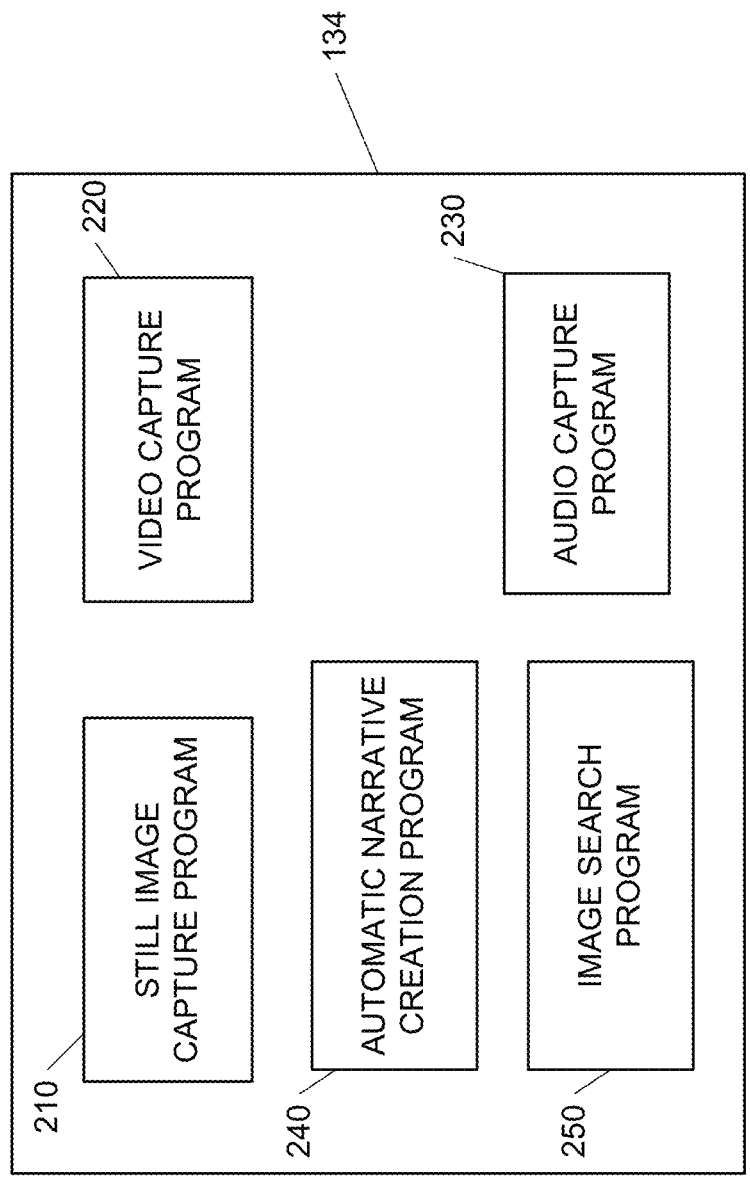
FIG. 2 illustrates various software programs stored in the memory shown in FIG. 1, in accordance with some embodiments.

FIG. 2 illustrates various software programs stored in the memory 130 shown in FIG. 1, in accordance with some embodiments. In some embodiments, the memory 130 includes a still image capture program 210, a video capture program 220, and an audio capture program 230. These programs are executed by the computing device 100 in response to a user selection. The programs assist in the capture of various content. The memory 130 also includes an image search program 250 that is in communication with the internet to perform various image searching operations associated with the images captured by the image sensor 140. The memory 130 also includes an automatic narrative creation program 240 to generate automatically a narrative associated with the captured images by accessing a remote server using the internet.

Figure 3:
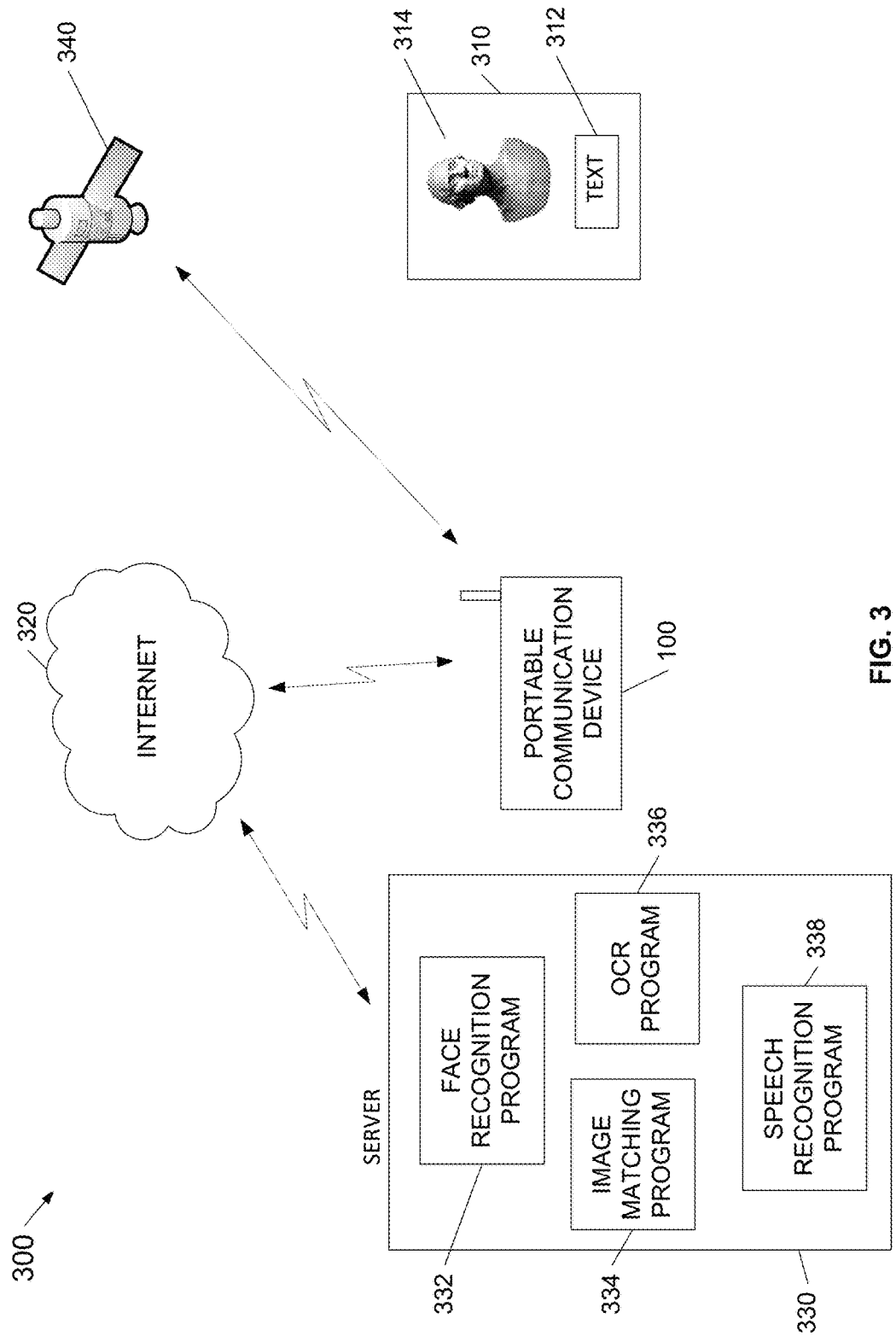
FIG. 3 illustrates a system for automatic narrative creation, in accordance with some embodiments.

FIG. 3 illustrates a system 300 for automatic narrative creation, in accordance with some embodiments. In some embodiments, the system 300 includes the computing device 100, an image 310 of an object 312 and text 314, internet 320, a server 330 and a GPS satellite 340 or other source of geographic location information. The computing device 100 uses the GPS satellite to determine positional information and time-stamps associated with each of the images captured by image sensor 140 and stored in memory 130 or data storage device 120. In some embodiments, the captured images are transmitted by the computing device 100 to a server 330 for further processing.

In some embodiments, the server 330 includes a face recognition program 332, an image matching program 334, an optical character recognition program 336, and a speech recognition program 338. In some embodiments, the server 330 receives a set of captured images from the computing device 100 and uses the face recognition program 332 to determine whether a particular face within the captured images is a recognizable face based on the previously stored images available to server 330. In some embodiments, the server 330 receives a set of captured images from the computing device 100 and uses the image matching program 334 to determine whether the object 312 and the text 314 matches with any previously captured objects or texts that is accessible to server 330. In some embodiments, the server 330 uses the optical character recognition program 336 to determine whether any of the captured images includes textual information. In some embodiments, the server 330 uses the speech recognition program 338 to determine content of the speech associated with a particular video image captured by image sensor 140 in the computing device 100. In one example, the speech is converted to textual information and the semantics of the textual information is analyzed to determine the content of the speech.

Figure 4:
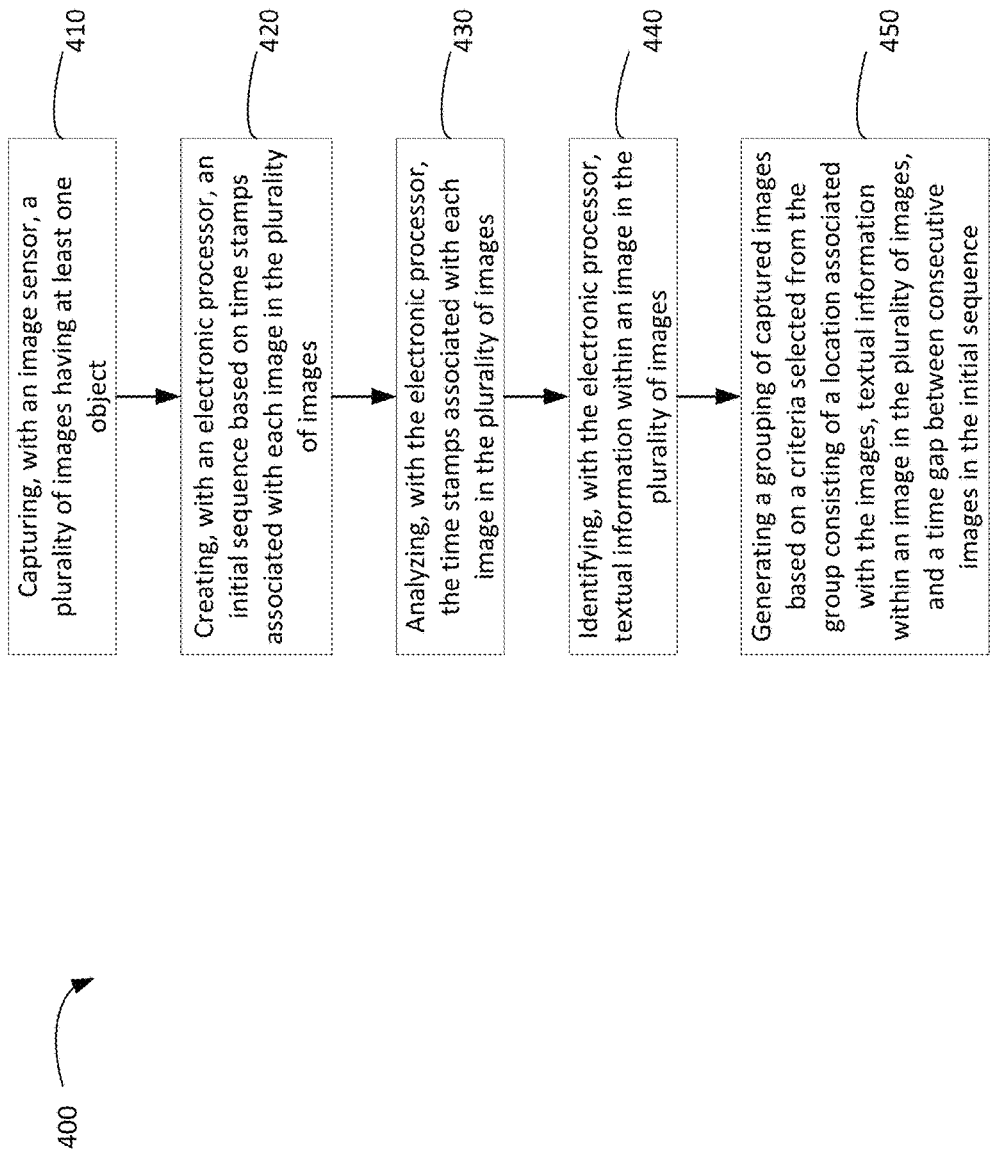
FIG. 4 is a flow chart of a method for automatic narrative creation, in accordance with some embodiments.

Regardless of the configuration of the system 300, the system 300 is configured to provide automatic narrative creation for captured content. For example, FIG. 4 is a flow chart illustrating a method 400 for providing automatic narrative creation for captured content, according to some embodiments.

In the example illustrated, the method 400 includes capturing, with the image sensor 140, a set of images having at least one object 312 (at block 410) using a computing device 100. In some embodiments, the method 400 includes capturing video using the image sensor 140 and sound with the microphone 150. In one example, the object 312 is a person's face. In some embodiments, the object 312 may include a photo, a painting, a statue, a piece of furniture, a building façade, a landmark, or other structure. In one example, as a user visits a particular location such as a museum, the user captures images of objects, signs, and captions on the walls, etc. using the user's computing device 100 (for example, a smart phone). The captured images are stored in either the memory 130, the data storage device 120, or the server 330. In some embodiments, the method 400 includes combining the order of the captioned objects, transcriptions of the captured signs and captions. In some embodiments, the method 400 includes performing visual recognition of the captured objects (for example, paintings, pictures, sculpture, and other relevant entities) and determining location information associated with the user's location. In some embodiments, the location information is used to identify the particular museum the user is visiting. In some embodiments, the method 400 includes identifying the particular event within the museum that the user is visiting.

In one example, the method 400 includes creating, with the electronic processor 110, an initial sequence of images based on time stamps associated with each image in a set of images (at block 420). The initial sequence of images may be placed in either one or more groupings based on the type of objects or texts contained within the images. In some embodiments, the various groupings of images are determined based on the positional information (for example, available in the meta data associated with each image) of the images. In some embodiments, the images captured at a particular area of a museum form one grouping as opposed to images captured at another area of the museum that may be grouped separately. In some embodiments, the captured images are grouped based on a particular artist's work that the captured images relate to. In one example, captured images of paintings are grouped based on a particular type of work (for example, impressionism, surrealism, cubism, etc.) associated with the paintings that the captured images relate to.

In one example, the method 400 includes analyzing, with the electronic processor 110, the time stamps associated with each of the plurality of images (at block 430). In one example, the electronic processor 110 is configured to determine whether there the time difference between any two consecutive images is substantially larger (for example, if the time difference is more than twice the time difference between any other two consecutive images within the plurality of images) than the time difference between any other set of consecutive images within the grouping. In some embodiments, if it is determined that the time gap between one image and the next image is substantially large then the two images will be placed in separate groupings such that a first grouping is assumed to have ended and a second grouping is assumed to have started. In some embodiments, the proximity of the various objects captured in the images and the time gaps between the images of various objects captured by the image sensor 140 are correlated to verify and determine the various groupings that are assigned to the images. In one example, textual information captured in one image is correlated with an object in another image based on the proximity of the two images. In some embodiments, multiple images are compared to each other to determine if they share a common object, textual information, semantic, location, edge or a background. In one example, if the images share at least one of a common object, textual information, semantic, location, edge, and a background, then those images that share at least one of the above characteristics are tightly correlated with each other and added to the same grouping.

In one example, the method 400 includes identifying, with the electronic processor 110, textual information within each of the plurality of images (at block 440). The textual information may be determined using an optical character recognition (OCR) program at the server 330. In some embodiments, the electronic processor 110 is configured to identify an object's caption, a welcome sign, introduction text, or a general description associated with one of the works in the museum that is captured by computing device 100. In some embodiments, the electronic processor 110 is configured to determine the relative size differences between textual objects, the relative text weight differences, the relative text positioning, such as text within a list, a bulleted list, side-by-side positioning of text, text within a table structure, etc. In one example, the electronic processor 110 is configured to differentiate the difference between a title and a body of captured text based on the different text sizes that are used for each. In one embodiment, the electronic processor 110 is configured to determine a caption for an image based on the text size associated with textual information within the image. In one example, if the text size within a captured image is less than half the text size within other images in a particular grouping, then the text with smaller text size may not be used for determining a caption for the grouping. In one example, if the text size within a portion of the captured image is larger than the remaining text in the captured image, then the text associated with the larger text size may be used to determine a caption for the image. In some embodiments, if the captured text has the same or substantially the same text size that is used for the letters in the text, then the text may be used for determining a caption for an image or a group of images. In one example, if a captured image contains a larger amount of text compared to the amount of text present in other images that are taken of objects around the same time and place, then the system 300 will not use the text for determining a caption for the captured image.

In one example, the method 400 includes grouping captured images based on at least one of the following criteria. The various criteria may include a location associated with the images, textual information within the plurality of images, a time gap between consecutive images in the initial sequence (at block 450). In some embodiments, if the timing of an image determines that the captured text is at the beginning of a sequence of images, then the electronic processor 110 is configured to label the captured text as the overall title for the sequence of images. On the other hand, if the time-stamp of the captured text is determined to be not at the beginning of the sequence of images then the captured text may be used as the title for the following sequence of images. In some embodiments, if the location of several captured objects is the same, then the electronic processor 110 is configured to assign a close correlation between the objects. In one example, when a textual object's position is similar to another object, then the textual object is assigned as the caption of the object that has a similar position to the textual object. In another example, if positional information for the captured images is not available, then the electronic processor 110 is configured to analyze the time gaps between different captured objects and captured textual objects and associate the text to the object having the smallest time gaps.

In some embodiments, the electronic processor 110 is configured to verify and enhance the captured information associated with the images captured by the image sensor 140. In some embodiments, text contained within captured images is analyzed to determine the semantics (for example, the meaning of a word, phrase, sentence or a text) and a textual search is performed to determine the context associated with the captured images. For example, assume the text contained within the captured images is "The Mona Lisa is the earliest Italian portrait to focus so closely on the sitter in a half-length portrait. Among the aspects which remain unclear are the exact identity of the sitter, who commissioned the portrait, how long Leonardo worked on the painting, and how it came to be in the French royal collection." Then the electronic processor 110 is configured to analyze the text and determine semantics such that the following information may be gathered:

Painting="Mona Lisa"
Artist="Leonardo da Vinci"
Origin="Italian"
Type="Sitting portrait"

In some embodiments, the semantics derived from textual information may be tagged to related images based on proximity of the textual information to the captured image. In some embodiments, various geographical data (for example, buildings, landmarks, roads, etc.) is used to correlate the sequence various images of events captured in a particular geographical area. In some embodiments, information associated with the geographical data is used to determine the textual content within images captured by the image sensor 140.

In some embodiments, the electronic processor 110 is configured to determine whether a captured object (for example, photo, painting, statue, furniture, building façade, bridge or other objects) matches an existing object stored on or in the server 330. In response to finding or determining a match a between a captured object an existing object, the electronic processor 110 is configured to generate a user suggestion (for example, display a suggestion to the user) that additional content is available and that the additional content is relevant to the narrative that the user is creating with the captured images. In some embodiments, a captured object or text is determined to be significant based on a web search scoring or based on the number of references or articles that cite to the object or text. In some embodiments, the electronic processor is configured to conduct a search for an object or a text that is similar or related to the captured object or text. In one example, the search for objects or text that is similar or related to the captured object or text includes searching for names of people, objects, dates, short descriptions, introductions, etc. In some embodiments, the search results for text that is similar or related to the captured text is provided for the user to select the appropriate information that provides context to the captured object or text and supplement the narrative associated with the captured images. In some embodiments, the electronic processor 110 is configured to associate captured objects with each other based on the search results.

In some embodiments, the electronic processor 110 is configured to analyze the visual information from the captured images, and when an image has captured both text and object information, use the relative positioning between the objects to associate the text as a caption to the image, and correlate the other individual captured objects. In some embodiments, when the electronic processor 110 receives context (such as names, dates with significant importance, places, etc.) associated with search results related to captured objects, the system 300 may offer the user an option to link the search results with the captured images.

In some embodiments, a server may execute the software described herein, and a user may access and interact with the software application using a computing device. Also, in some embodiments, functionality provided by the software application as described above may be distributed between a software application executed by a user's personal computing device and a software application executed by another electronic process or device (for example, a server) external to the computing device. For example, a user can execute a software application (for example, a mobile application) installed on his or her smart device, which may be configured to communicate with another software application installed on a server.

Various features and advantages of some embodiments are set forth in the following claims.

What is claimed is:

1. A computing device, the computing device comprising:
    an image sensor to capture an image of an object;
    an electronic processor electrically coupled to the image sensor and configured to
        determine a geographic location and a time-stamp associated with the image;
        identify textual information in the image;
        determine semantics associated with the textual information;
        determine captions for the image based on at least one of the geographic location, the time-stamp, and semantics associated with the textual information; and
        organize the image into one or more groups based on one or more criteria selected from the group consisting of a location of the object within the image, the time-stamp associated with the image, and the semantics associated with the textual information in the image.

2. The computing device of claim 1, wherein the electronic processor is configured to determine a match of the image with one or more previously stored images and generate a narrative associated with the image.

3. The computing device of claim 2, wherein in response to the match of the image with one or more previously stored images, determine at least one of a name, a time, a date, and a description associated with the object in the image.

4. The computing device of claim 1, wherein the electronic processor is configured to perform a web query of the textual information in the image and organize the image based on data received from the web query.

5. The computing device of claim 1 in communication with a server, the server configured to search for content associated with the object and the textual information using a web query and generate a narrative associated with the image.

6. The computing device of claim 1, wherein the electronic processor is configured to
    determine a caption for the image based on at least one of the geographic location associated with the image and semantics associated with the textual information in the image.

7. The computing device of claim 6, wherein the electronic processor is configured to perform an image search of the object and retrieve additional textual information to generate a narrative associated with the image.

8. A method for automatic narrative creation for captured content, the method comprising:
    capturing, with an image sensor, a plurality of images having at least one object;
    creating, with an electronic processor, an initial sequence of the plurality of images based on a time stamp associated with each image in the plurality of images;

identifying, with the electronic processor, textual information within at least one image in the plurality of images; and generating a grouping of the plurality of images based on a criteria selected from a group consisting of a geographic location associated with the plurality of images, the textual information within an image in the plurality of images, a search score associated with the at least one object, and a time gap between consecutive images in the initial sequence of the plurality of images.

9. The method of claim 8 further comprising:

analyzing, with the electronic processor, the time stamp associated with each image in the plurality of images to generate a first grouping and a second grouping of the plurality of images.

10. The method of claim 8 further comprising:

matching a first object included in a first image with one or more previously stored images, the first image included in the plurality of images.

11. The method of claim 10, wherein in response to matching the first object included in the first image with one or more previously stored images, determine at least one of a name, a time, a date, and a description associated with the first object in the first image.

12. The method of claim 8, wherein identifying textual information within at least one image in the plurality of images includes performing optical character recognition on the at least one image in the plurality of images.

13. The method of claim 12, further comprising:

determining a title for the plurality of images based on analyzing difference in text size of letters in the textual information within at least one image in the plurality of images.

14. The method of claim 8 further comprising:

determining semantics associated with the textual information within at least one of the plurality of images.

15. The method of claim 8 further comprising:

determining a search score associated with at least one image selected from the plurality of images.

16. The method of claim 15 further comprising:

using the search score associated with the at least one image selected from the plurality of images for generating the grouping of the plurality of images.

17. The method of claim 11 further comprising:

determining captions for the plurality of images based on at least one of the geographic location associated with the plurality of images and semantics associated with the textual information within the first image.

18. A non-transitory computer-readable medium containing computer-executable instructions that when executed by one or more processors cause the one or more processors to:

capture, with an image sensor, a plurality of images having at least one object;

create, with an electronic processor, an initial sequence of the plurality of images based on a time stamp associated with each image in the plurality of images;

analyze, with the electronic processor, the time stamp associated with each image in the plurality of images;

identify, with the electronic processor, a textual information within at least one image in the plurality of images;

generate a grouping of the plurality of images based on a criteria selected from a group consisting of a geographic location associated with the plurality of images, the textual information within an image in the plurality of images, a search score associated with the at least one object, and a time gap between consecutive images in the initial sequence of the plurality of images; and automatically create a narrative associated with the plurality of images.

19. The non-transitory computer-readable medium of claim 18, wherein the one or more electronic processors is configured to match a first object included in a first image with one or more previously stored images, the first image included in the plurality of images.

20. The non-transitory computer-readable medium of claim 18, wherein the one or more electronic processors is configured to determine captions for the plurality of images based on semantics associated with the textual information within at least one of the plurality of images.

* * * * *